United States Patent [19]

Sato et al.

[11] Patent Number: 5,009,103
[45] Date of Patent: Apr. 23, 1991

[54] ULTRASONIC THICKNESS MEASURING METHOD AND APPARATUS

[75] Inventors: Izumi Sato, Yokosuka; Koji Saito, Kawasaki; Takashi Inoue, Tokyo, all of Japan

[73] Assignee: Tokyo Keiki Co., Ltd., Tokyo, Japan

[21] Appl. No.: 304,445

[22] Filed: Jan. 31, 1989

[30] Foreign Application Priority Data

| Feb. 1, 1988 | [JP] | Japan | 63-21681 |
| Feb. 1, 1988 | [JP] | Japan | 63-21682 |
| Feb. 4, 1988 | [JP] | Japan | 63-14063 |

[51] Int. Cl.$^5$ .............................................. G01N 9/24
[52] U.S. Cl. ..................................... 73/597; 364/563
[58] Field of Search ............... 73/597, 602, 614, 615, 73/616; 364/562, 563, 569

[56] References Cited

U.S. PATENT DOCUMENTS

| 3,339,403 | 9/1967 | Barnes | 73/616 |
| 3,354,700 | 11/1967 | Schindler | 73/616 |
| 3,427,868 | 2/1969 | Charbonnier et al. | 73/616 |
| 3,690,154 | 9/1972 | Wells et al. | 73/616 |

*Primary Examiner*—Hezron E. Williams
*Assistant Examiner*—Louis M. Arana
*Attorney, Agent, or Firm*—Lowe, Price, Leblanc, Becker & Shur

[57] ABSTRACT

An ultrasonic thickness measuring method and apparatus in which an ultrasonic pulse is transmitted from a probe to a material to be measured and resulting multiple reflection pulses from the material to be measured are detected to obtain a time interval between the reflection pulses for measuring the thickness of the material. This method and apparatus features, for example, comprises counting a time from transmission of the ultrasonic pulse to reception of a first reflection pulse from a bottom of the material to be measured; detecting a pulse received within a preset period of time after said first reflection pulse has been received and just before a time corresponding to the counted time has passed, as a second reflection pulse; and counting a time between the reception of the first reflection pulse and the reception of the second reflection pulse to measure the thickness of the material.

8 Claims, 14 Drawing Sheets

ULTRASONIC THICKNESS MEASURING METHOD AND APPARATUS

BACKGROUND OF THE INVENTION a. Field of the Invention

This invention relates to an ultrasonic thickness measuring method and apparatus in which a probe placed in contact with a material to be measured transmits an ultrasonic pulse and detects reflection pulses from the material to measure the time of travel of the ultrasonic pulse through the material for obtaining a thickness of the material and it further relates to a check apparatus used with the ultrasonic thickness measuring apparatus for checking an operation condition of the apparatus. More particularly, this invention relates to an ultrasonic thickness measuring method and apparatus suitable for measuring a thickness of the material by using multiple reflection pulses and a check apparatus suitable for the method and apparatus.

b. Related Arts

FIG. 6 is a block diagram showing one form of a conventional ultrasonic thickness measuring apparatus.

In the figure, 101 is a synchronizing circuit generating a synchronizing pulse for determining an ultrasonic pulse transmission timing, 102 is a transmitting circuit generating electric pulse for energizing a probe, 103 is the probe for transmitting and receiving ultrasonic pulses, 104 is a receiving circuit receiving and amplifying multiple echo or reflection pulses, 112 is a second clock circuit generating a clock pulse indicative of a unit time, 113 is a third AND gate selecting the clock pulse, 114 is a counter circuit counting pulses output from the third AND gate 113, 115 is a digital indicator, 116 is a material to be measured which is coated with a couplant and placed in contact with the probe 103 to be subjected to thickness measurement, 117 is a control circuit for controlling delay of reflection pulse receiving and controlling a gain, and 118 is a CRT display indicating multiple reflection pulses.

With this arrangement, the conventional ultrasonic thickness measuring apparatus will operate as follows:

An ultrasonic pulse transmitted from the probe 103 in response to a synchronizing pulse which is output from the synchronizing circuit 101 is subjected to multiple reflection between a bottom and a surface of the material to be measured. The reflection pulses are received by the receiving circuit 104 and a measuring gate is provided by a second flip-flop circuit 111 in such a way that a period between one reflection pulse and a next reflection pulse is kept high. The reflection pulses are indicated on the CRT display 118.

At this time, receiving gain control or gate delaying control is carried out by the control circuit 117 so as to minimize interference of undesired signals into the multiple reflection pulses.

Further, sweep traces of the CRT display 118 are adjusted to check the indication position of the reflection pulses and the measuring range.

FIG. 7 shows operating waveforms for the conventional ultrasonic thickness measuring apparatus. In the figure, ⑩ to ⑫ indicate waveforms appearing at positions denoted by corresponding numerals in the circuit of FIG. 6. ⑩ shows a transmission pulse T and a first reflection B1 and a second reflection pulse B2 from the bottom of the material 116 to be measured. ⑪ shows a measuring gate of a rectangular signal proportional to a time interval between the first reflection pulse B1 and the second reflection pulse B2 output from the second flip-flop circuit 11. ⑫ shows "and" output pulse of the measuring gate and the clock pulses indicative of the unit time. The output pulses are counted and the thickness measurement results for the material 116 to be measured are presented on the digital indicator 115.

The conventional ultrasonic thickness measuring apparatus as described above further has the CRT display 118 for selecting multiple reflection pulses from the material 116 to be measured. More particularly, the gate may be adjusted by monitoring the CRT display 118 to minimize interfering signals such as noises or other undesired signals. Checking of the indication position of the reflection pulses and the measuring range is also carried out.

The thickness measurement is effected by using a measuring gate corresponding to a time interval between the first reflection pulse B1 and the second reflection pulse B2. In this case, the second reflection pulse B2 is detected by visually discriminating it among the received signals indicated at equal intervals on the CRT display.

This conventional ultrasonic thickness measuring method or apparatus has another disadvantage that normal measurement is prevented by damped oscillation of the first reflection pulse B1 or delayed signals generated between the first reflection pulse B1 and the second reflection pulse B2 and appearing through other propagation paths.

The present invention is made to overcome the disadvantages involved in the conventional technique and it is an object of the present invention to provide an ultrasonic thickness measuring method and apparatus of a reduced size and weight which is capable of automatically eliminating undesired signals and capable of effecting accurate thickness measurement, without providing the CRT display, by using multiple reflection pulses of less interference or noises.

There has been another form of ultrasonic thickness measuring apparatus which employs a probe with a delay member.

FIG. 10 illustrates one example of the conventional ultrasonic thickness measuring apparatus of the type. In the figure, 201 is a synchronizing circuit generating a timing signal for ultrasonic pulse transmission, 202 is a transmitting circuit energizing a probe, 203 is the probe with a delay member such as a delay line, 204 is a material to be measured which is coated with a couplant such as oil and placed in contact with the probe 203 having the delay member to measure the thickness, 205 is a receiving circuit receiving and amplifying multiple reflection pulses from the material 204 to be measured, 220 is a flip-flop circuit outputting a measuring gate having a width corresponding to a time interval of the reflection pulses output from the receiving circuit, 219 is a control circuit controlling a receiving gain of the receiving circuit 205 or an operation of the flip-flop circuit 220, 221 is a CRT display presenting an A scope waveform output from the receiving circuit 205, 222 is a second clock circuit generating clock pulse signals, 223 is an AND gate outputting "and" of the output from the flip-flop circuit 220 and the clock signals, 224 is a counter for counting the number of pulses output from the AND gate 223, and 225 is an indicating circuit for indicating the counting results.

In the conventional ultrasonic thickness measuring apparatus arranged as described above, an ultrasonic pulse transmitted to the material 204 to be measured from the probe 203 with the delay member by a timing signal output from the synchronizing circuit 201 travels through the delay member made for example of an acrylic material and is incident upon the material 204 to cause multiple reflection between a surface and a bottom of the material 204. The reflection pulses from the material 204 are amplified by the receiving circuit 205 and presented on the CRT display 221. At this time, the control circuit 219 controls the reception gain or operation of the flip-flop circuit 220 to minimize interference of undesired signals such as parastic signals for the transmission pulse or reflection pulses from the surface of the material with the multiple reflection pulses within the material 204 to be measured.

Further, sweep trace of the CRT display 221 is adjusted to check the indication position of the reflection pulse or measuring range.

FIG. 11 shows an example of operation waveform in the conventional ultrasonic thickness measuring apparatus. ⑮ includes a transmission pulse T together with a first surface reflection pulse S1 from the surface of the material 204 to be measured, a first bottom reflection pulse B1 and a second bottom reflection pulse B2 from the bottom of the material and a second surface reflection pulse S2 from the surface of the material, ⑯ is a measuring gate proportional to a time interval between the first bottom reflection pulse B1 and the second bottom reflection pulse B2, and ⑰ is an output signal from the AND gate 223 which is an "and" of the measuring gate and a clock pulse signal. The number of the clock pulses output from the AND gate 223 is proportional to the thickness of the material to be measured. The pulse number of ⑰ is counted by the counter 224 and the count result is indicated on the indicator 225 as the thickness of the material.

FIG. 12 is another example of operation waveform in the conventional thickness measuring apparatus. This example is for a measurement in which a material 204 to be measured has a large thickness and a probe used has a small delay member. In this measurement, the second surface reflection pulse S2 appears between the first bottom reflection pulse B1 and the second bottom reflection pulse B2 and the second surface reflection pulse S2 prevents accurate thickness measurement.

To solve this problem, the conventional ultrasonic thickness measuring apparatus as described above uses a CRT display 221 for selecting multiple bottom reflection pulses among multiple reflection pulses from the surface and the bottom of the material 204 to be measured. More particularly, a delay time of the delay gate is adjusted while watching the CRT display 221 to eliminate interference by the transmission pulse and the multiple reflection pulses from the surface of the material 204 to be measured. Further, an indication position of the reflection pulses and a measuring range are checked.

In the conventional apparatus, the thickness measurement is carried out by using the measuring gate lasting from the first bottom reflection pulse B1 to the second reflection pulse B2 and counting the number of clock pulses within the measuring gate. However, a delay amount of the delay gate should be adjusted to eliminate interference by the transmission pulse T and the multiple reflection pulses from the surface of the material 204 to be measured.

Further, when the delay member attached to the probe 3 has different lengths or the sonic velocity of the delay member is varied with a variation of temperature etc., the above-mentioned adjustment are necessitated.

The conventional apparatus has such a disadvantage that the structure and the operation should inevitably be complicated and the entire size of the apparatus should be large to provide the CRT display therein and to select reflection pulses from the bottom of the material.

Therefore, the present invention has been made also to solve this problem and it is a second object of the present invention to provide an ultrasonic thickness measuring method and apparatus which is capable of assuring accurate thickness measurement, while automatically minimizing the transmission pulse and multiple reflection pulses from the surface of the material to be measured or reducing noises without using the CRT display, and automatically compensating variation of delay amount of the delay member.

In this connection, it is to be noted that contact between the probe for transmitting and receiving ultrasonic wave and the material to be measured is a very important factor of the measurement effected by the apparatus which detects reflection pulses from the material to be measured for measuring the thickness as described above.

More particularly, the ultrasonic thickness measuring apparatus measures a thickness of a material by placing the probe in contact with the material to be measured, transmitting ultrasonic pulse and detecting reflection pulses from the material to measure a thickness from the travel time of the ultrasonic pulse through the material. A check apparatus is used for such an ultrasonic thickness measuring apparatus for checking the contact conditions between the probe and the material to be measured, the couplant film conditions, acoustic coupling defects due to surface roughness of the material to be measured, breaking of the probe cable, attenuation of ultrasonic wave within the material to be measured, lowering of the ultrasonic wave transmission output, or deterioration of performance of the thickness measuring apparatus.

FIG. 16 is an explanatory view showing a conventional check apparatus for use with an ultrasonic thickness measuring apparatus. In this example, a separate type probe is used which comprises an ultrasonic transmitter and receiver.

In the figure, 302a is a separate type probe which comprises an ultrasonic transmitter and receiver formed integrally with each other, 311 is a piezoelectric vibrator effecting electric-acoustic converting, 312a is the ultrasonic transmitter, 312b is the ultrasonic receiver and 313 is a material whose thickness is to be measured.

In the check apparatus for the ultrasonic thickness measuring apparatus as described above, the separate type probe 302a is pressed against the material 313 made for example of metals through a couplant such as an oil or water applied on the surface of the material. When an ultrasonic pulse T is transmitted to the material 313 from the ultrasonic transmitter 312a, a first reflection pulse S1 from the surface of the material 313 is received by the ultrasonic transmitter 312a and a second reflection pulse B1 from the bottom of the material 313 is received by the ultrasonic receiver B1.

The thickness measurement is effected, while correcting a time interval between the first reflection pulse S1 and the second reflection pulse B1 according to a sonic velocity of the material 313. At this time, a flip-flop circuit FF is used for the measurement. The flip-flop circuit FF rises by the first reflection pulse S1 and inverts its operation by the second reflection pulse B1. If the second reflection pulse B1 obtained is not at a certain level, the flip-flop circuit FF is not inverted. Therefore, the second reflection pulse B1 can be checked by monitoring the inversion of the flip-flop circuit FF.

FIG. 17 is a similar explanatory view showing another check apparatus utilizing a single reflection pulse according to single probe technique using a single transducer.

In the figure, 311 is the piezoelectric vibrator, 313 is the material to be measured and 302 is a probe for transmitting and receiving ultrasonic pulses.

The piezoelectric vibrator 311 of the probe 302 is pressed against the material 313 to be measured and an ultrasonic pulse T is transmitted to the material 313. The ultrasonic pulse travels through the material and a reflection pulse B1 from the bottom of the material is received by the probe 302. The measurement of the thickness of the material 313 is effected, while correcting the time interval between the ultrasonic pulse T and the reflection pulse B1 from the bottom according to the sonic velocity. To carry out the measurement accurately, a check appratus is employed in which the level of the reflection pulse B1 is observed by the CRT display.

FIG. 18 is an explanatory view showing a further example of a conventional check apparatus for an ultrasonic thickness measuring apparatus.

In this example, single probe technique utilizing multiple reflection pulses is employed.

According to this example, multiple pulses which are obtained from an ultrasonic pulse T transmitted by the probe 302 and travelled through the material 313 are utilized, a first reflection pulse B1 from the bottom and a second reflection pulse B2 from the bottom are received and a time interval between the reflection pulses is corrected according to the sonic velocity of the material 313 to measure the thickness.

At this time, levels of the first reflection pulse B1 and the second reflection pulse B2 are observed by a CRT display to check the pulses. The CRT display employed is for example a CRT display 118 as shown in FIG. 6.

FIG. 19 is an explanatory view showing a still further example of a conventional check apparatus for an ultrasonic thickness measuring apparatus.

This example employs a probe with a delay member according to single probe technique.

In the figure, 302b is a probe having a member giving a delay to ultrasonic wave propagation which is provided on a radiation face of a piezoelectric vibrator 311 and 312 is the delay member made, for example, of acrylic materials.

When an ultrasonic pulse T is transmitted from the probe 302b to the material 313 to be measured, a first reflection pulse S1 from a surface of the material 313, a second reflection pulse B1 which is a first reflection pulse from a bottom of the material 313, a third reflection pulse B2 which is a second reflection pulse from the bottom and a fourth reflection pulse S2 which is a second reflection pulse from the surface of the material 313 are received by the probe 302b.

The measurement of the thickness is effected, while correcting a time interval between the second reflection pulse B1 and the third reflection pulse B2 according to a sonic velocity of the material 313. At this time, levels of the second reflection pulse B1 and the third reflection pulse B2 are observed by using a CRT to check them.

These conventional check apparatuses as described above, however, has the following problems.

In the case where the separate type probe 302a is employed, check is made only by the second reflection pulse B1 from the bottom of the material, but check is not made by the first reflection pulse S1.

In the case where single probe technique is employed, the operation check is made by observing the reflection pulses used for the thickness measurement on the CRT display. Thus, the CRT display should be provided and the entire configuration becomes complicated and large.

Further, the conventional check apparatus should have different configurations for different kinds of the probes or thickness measurement techniques, so that the CRT display should be adjusted according to the thickness of the material to be measured or a change of the sonic velocity of the material.

It is therefore a third object of the present invention to provide a check apparatus for an ultrasonic thickness measuring apparatus which is capable of automatically indicating the check results for the reflection pulses utilized in the measurement without making any adjustment, even when the thickness or sonic velocity of the material to be measured or the kind of the probe or thickness measurement technique is changed.

DISCLOSURE OF INVENTION

To attain the first object as described above, the present invention features an ultrasonic thickness measuring method in which an ultrasonic pulse is transmitted from a probe to a material to be measured and resulting multiple reflection pulses from the material to be measured are detected to obtain a time interval between the reflection pulses for measuring the thickness of the material, which comprises: counting a time from transmission of the ultrasonic pulse to reception of a first reflection pulse from a bottom of the material to be measured; detecting a pulse received within a preset period of time after said first reflection pulse has been received and just before a time corresponding to the counted time has passed, as a second reflection pulse; and counting a time between the reception of the first reflection pulse and the reception of the second reflection pulse to measure the thickness of the material.

Further, to attain the first object of the present invention, the present invention features an ultrasonic thickness measuring apparatus having a probe, utltrasonic pulse transmitting/receiving means transmitting an ultrasonic pulse to a material to be measured through the probe and receiving and detecting resultant multiple reflection pulses from the material and pulse interval counting means obtaining a time interval between the detected pulses to measure a thickness of the material from the obtained time interval, which apparatus comprises: second reflection pulse detecting gate setting means counting a time between the transmission of the ultrasonic pulse and reception of a first reflection pulse from a bottom of the material and setting a second reflection pulse detecting gate which opens when a time shorter than the counted time by a preset gate width has been past after reception of said first reflection pulse and closes when a time corresponding to the counted time has past after reception of the first reflection pulse; and second reflection pulse detecting means detecting a pulse received when said second reflection pulse detecting gate is open, as a second reflection pulse; said pulse interval counting means counting a time between reception of the first reflection pulse and detection of the second reflection pulse.

In the foregoing ultrasonic thickness measuring apparatuses, the second reflection pulse detecting gate setting means preferably comprises a clock generating circuit for generating clock pulses for time counting, an up/down counter which starts up-counting the clock pulses when the ultrasonic pulse has been transmitted and starts down-counting in response to the first reflection pulse from the bottom of the material, a detecting circuit for detecting that count number left in the down-counting corresponds to a width of the gate, and a latching circuit for latching an output in a period from the detection by the detecting circuit until the count number becomes zero to generate a control signal for holding the gate open during said period.

The up/down counter may be replaced with an ordinary counter.

To attain the second object of the present invention, the present invention features an ultrasonic thickness measuring method in which an ultrasonic pulse is transmitted from a probe with a delay member to a material to be measured and resulting multiple reflection pulses from the material to be measured are detected to obtain a time interval between the reflection pulses for measuring the thickness of the material, which comprises: counting a time from transmission of the ultrasonic pulse to reception of a first surface reflection pulse from a surface of the material to be measured; detecting a pulse received before a time corresponding to ½ of the counted time has passed after said first surface reflection pulse has been received, as a first bottom reflection pulse; detecting a pulse received after reception of said first surface reflection pulse and before a time corresponding to the counted time has passed and incident after detection of said first bottom reflection pulse, as a second bottom reflection pulse; and counting a time between detection of the first reflection pulse from the bottom of the material and detection of the second reflection pulse from the bottom of the material to measure the thickness of the material.

Further, to attain the second object, the present invention features an ultrasonic thickness measuring apparatus having a probe with a delay member, utltrasonic pulse transmitting/receiving means transmitting an ultrasonic pulse to a material to be measured through the probe with the delay member and receiving and detecting resultant multiple reflection pulses from the material and pulse interval counting means obtaining a time interval between the detected pulses to measure a thickness of the material from the obtained time interval, which apparatus comprises: first bottom reflection pulse detecting gate setting means counting a time between transmission of the ultrasonic pulse and reception of a first surface reflection pulse from a surface of the material and setting a first bottom reflection pulse detecting gate which opens upon reception of the first surface reflection pulse and closes when a time corresponding to substantially ½ of the counted time has passed; a second bottom reflection pulse detecting gate setting means counting a time between transmission of the ultrasonic pulse and reception of the first reflection pulse from the surface of the material and setting a second bottom reflection pulse detecting gate which opens upon reception of said first surface reflection pulse and closes when a time corresponding to the counted time has passed; and bottom reflection pulse detecting means detecting a pulse received when said first bottom reflection pulse detecting gate is open, as a first bottom reflection pulse and detecting a pulse received when said second bottom reflection pulse detecting gate is open and after said second bottom reflection pulse has been detected, as a second bottom reflection pulse; said pulse interval counting means counting a time between reception of the first reflection pulse and detection of the second reflection pulse.

In the foregoing inventions, the first bottom reflection pulse detecting gate setting means and said second bottom reflection pulse detecting gate setting means have, in common, a counter which starts up-counting when the ultrasonic pulse has been transmitted and starts down-counting at a double speed in response to the reflection pulse from the surface of the material; said first bottom reflection pulse detecting gate setting means comprising a first gate control circuit for outputting a gate signal having a holding time from starting of the down-counting until the count value becomes zero and a gate circuit which opens by said gate signal; said second bottom reflection pulse detecting gate setting means comprising a second gate control circuit for outputting a gate signal which holds until the count value at start of the down-counting decreases to a value equal to an absolute value of said count value at start of the down-counting, but opposite in sign and a gate circuit which opens by said gate signal.

Although the counter is used in common in the apparatus, separate counters may alternatively be employed.

To attain the third object, the present invention features a check apparatus for use with an ultrasonic thickness measuring apparatus in which a probe is placed in contact with a material to be measured for transmitting an ultrasonic pulse and detecting reflection pulses from the material to measure a time of travel of the ultrasonic pulse through the material for measuring the thickness of the material, which check apparatus comprises: latching means including a plurality of latching circuits and holding and storing reflection pulses reflected from a surface of the material after transmission of the ultrasonic pulse and reflection pulses reflected from a bottom of the material and detected in time series in the corresponding latching circuits, respectively; and display means presenting latching states of the respective reflection pulses held and stored in the latching means.

In this invention, a flip-flop circuit may for example be used as the latching circuit. Therefore, the latching means as described above preferably comprises a synchronizing circuit for generating synchronizing pulses for transmitting the ultrasonic pulse, one flip-flop circuit which receives the synchronizing pulse at its data input terminal and a first reflection pulse from the material at its clock input terminal and inverts its polarity in response to the first reflection pulse to hold its output thus inverted, another flip-flop circuit which receives the output from said flip-flop circuit at its data input terminal and inverts its polarity in response to a second reflection pulse from the material to be measured to hold its output thus inverted and still another flip-flop circuit which receives the output from said another flip-flop circuit at its data input terminal and inverts its polarity in response to a third reflection pulse from the material to hold its output thus inverted.

This check apparatus may be a separate, independent unit from the ultrasonic thickness measuring apparatus or may be incorporated in the ultrasonic thickness measuring apparatus. In use, this check apparatus may be connected to the ultrasonic transmitting/receiving means of the respective ultrasonic thickness measuring apparatus. Alternatively, the check apparatus may have the ultrasonic transmitting/receiving means and connect the means to a probe to be checked.

The check apparatus according to the present invention may have part of the elements, such as a synchronizing circuit, flip-flop circuits, which comprises the same in common with the ultrasonic thickness measuring apparatus.

OPERATION

An operation of an invention employing a probe without a delay member will now be described, referring to a more concrete form of the invention.

This invention is based on a fact that a time from the transmission of the ultrasonic pulse to the arrival of the first reflection pulse B1 is substantially equal to a time from the first reflection pulse B1 to the second reflection pulse B2.

According to this invention, the up/down counter starts up-counting at the same time the ultrasonic pulse has been transmitted and changes its counting mode to down-counting upon detection of the first reflection pulse from the bottom of the material to be measured.

The latching circuit is put into a holding state upon detecting that the count value of the up/down counter reaches a predetermined value near zero and released when the value reaches zero. A gate is formed across the time interval to enable selection of the second reflection pulse from the bottom of the material to avoid influences by noises or undesired signals contained in the reception signals.

A time $t_{(T-B1)}$ from transmission of the ultrasonic pulse to reception of the first reflection pulse B1 includes a travel time through a front plate provided in front of the probe for protecting the same and/or an oil film used as a couplant between the probe and the material to be measured.

On the other hand, a time $t_{(B1-B2)}$ between the first reflection pulse B1 and the second reflection pulse B2 does not include the time as described above, so that it comprises only a time during which the ultrasonic pulse travels (reciprocates) through the material. The relationship may be expressed as follows:

$$t_{(T-B1)} > t_{(B1-B2)}$$

Therefore, the second reflection pulse B2 is produced always before the count value of the up/down counter reaches zero and selected by the gate as described above.

An operation of the invention employing a probe with a delay member in an ultrasonic thickness measuring apparatus will now be described, while referring to a more concrete form of the invention.

In the present invention, accurate thickness measurement is not assured unless the multiple reflection pulses B1 and B2 are obtained between the first surface reflection pulse S1 and the second surface reflection pulse from the surface of the material to be measured as shown by (15) in FIG. 11.

For example, if the second surface reflection pulse S2 exists between the multiple reflection pulses B1 and B2 from the bottom of the material to be measured, this second surface reflection pulse prevents accurate thickness measurement. To obviate this problem, the up counter starts up-counting at the same time the probe with the delay member has been energized and starts down-counting at a double speed immediately the first surface reflection pulse S1 from the surface of the material has been received.

The first bottom reflection pulse B1 from the bottom of the material is selected to be received by a first gate signal which lasts until the count value of the first counter reaches zero after it has been inverted. If the first gate signal does not cover the first bottom reflection pulse B1, the second bottom reflection pulse B2 is generated after the second surface reflection pulse S2 so that the thickness measurement using the probe with the delay member can not be effected.

On the other hand, the second bottom reflection pulse B2 is selected to be received by the second gate signal which lasts until the count value becomes a value equal to an absolute value when the counter has been inverted but opposite in sign after the first counter has been inverted. Since the timing when the second gate signal is closed is just before the second surface reflection pulse S2 arrives, the second surface reflection pulse S2 is not detected by the second gate signal.

As described above, the thickness measurement using the probe with the delay member can be free from possible interference of the multiple reflection pulses from the surface of the material.

An operation of the invention for the check apparatus will now be described, while referring to a concrete form of the invention.

In the present invention, a synchronizing pulse is applied to a data input of the flip-flop circuit and a plurality of flip-flop circuits are cascaded in such a manner that they sequentially apply respective outputs to data input terminals of the flip-flop circuits of respectively succeeding stage. The reflection pulses from the material to be measured are applied to the clock input terminals and the preset input terminals and indicators are provided for the outputs from the respective flip-flop circuits.

With this arrangement, the outputs from the respective flip-flop circuits are sequentially inverted and held according to the sequence of the reflection pulses reflected from the material to be measured. Therefore, the reflection pulses related to the thickness measurement can be checked automatically by the operation of the indicators provided for the outputs from the respective flip-flop circuits.

Through this checking of the reflection pulses, the contact conditions between the probe and the material to be measured, conditions of the couplant oil film, breaking of the probe cable, attenuation of the ultrasonic pulse within the material to be measured can be checked to assure accurate ultrasonic thickness measurement.

DETAILED DESCRIPTION OF THE INVENTION

Figure 1:
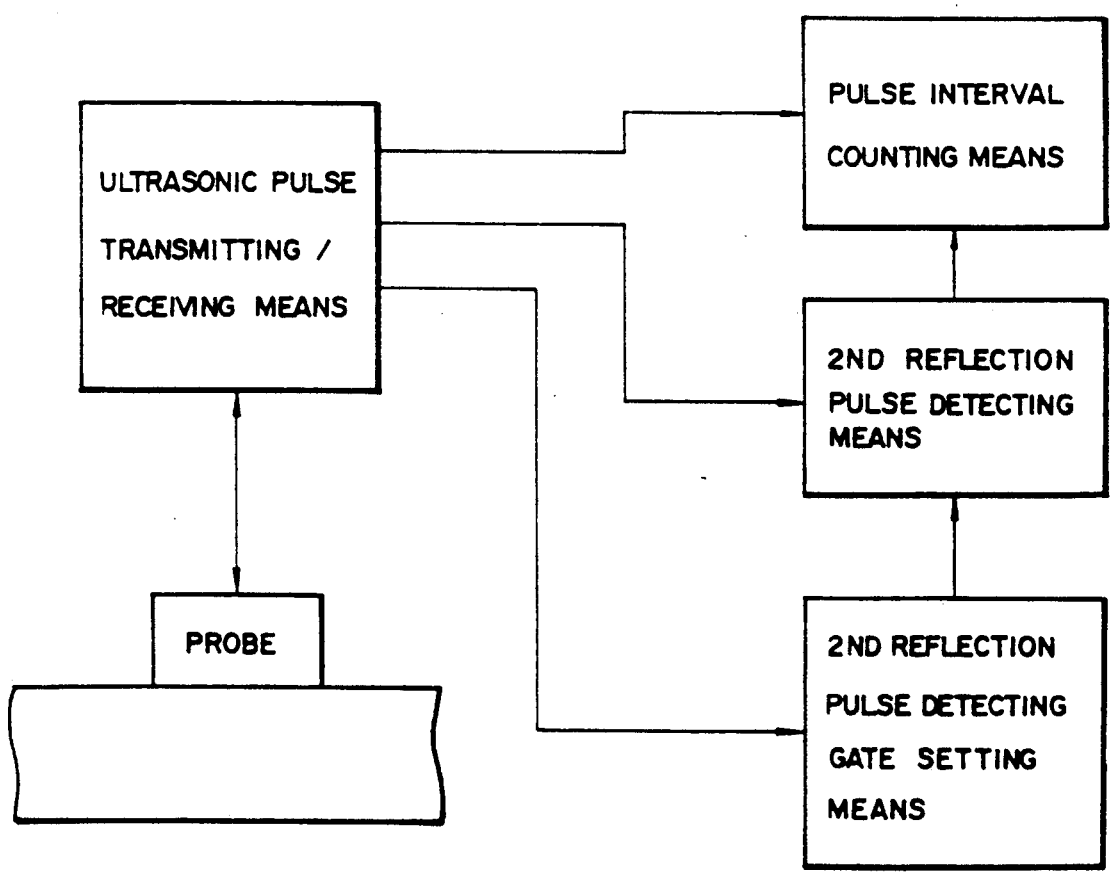
FIG. 1 is a block diagram of a configuration of an ultrasonic thickness measuring apparatus according to the present invention.

Embodiments of the present invention will now be described referring to the drawings. FIG. 1 is a generalized functional diagram of the apparatus of FIG. 4.

Figure 4:
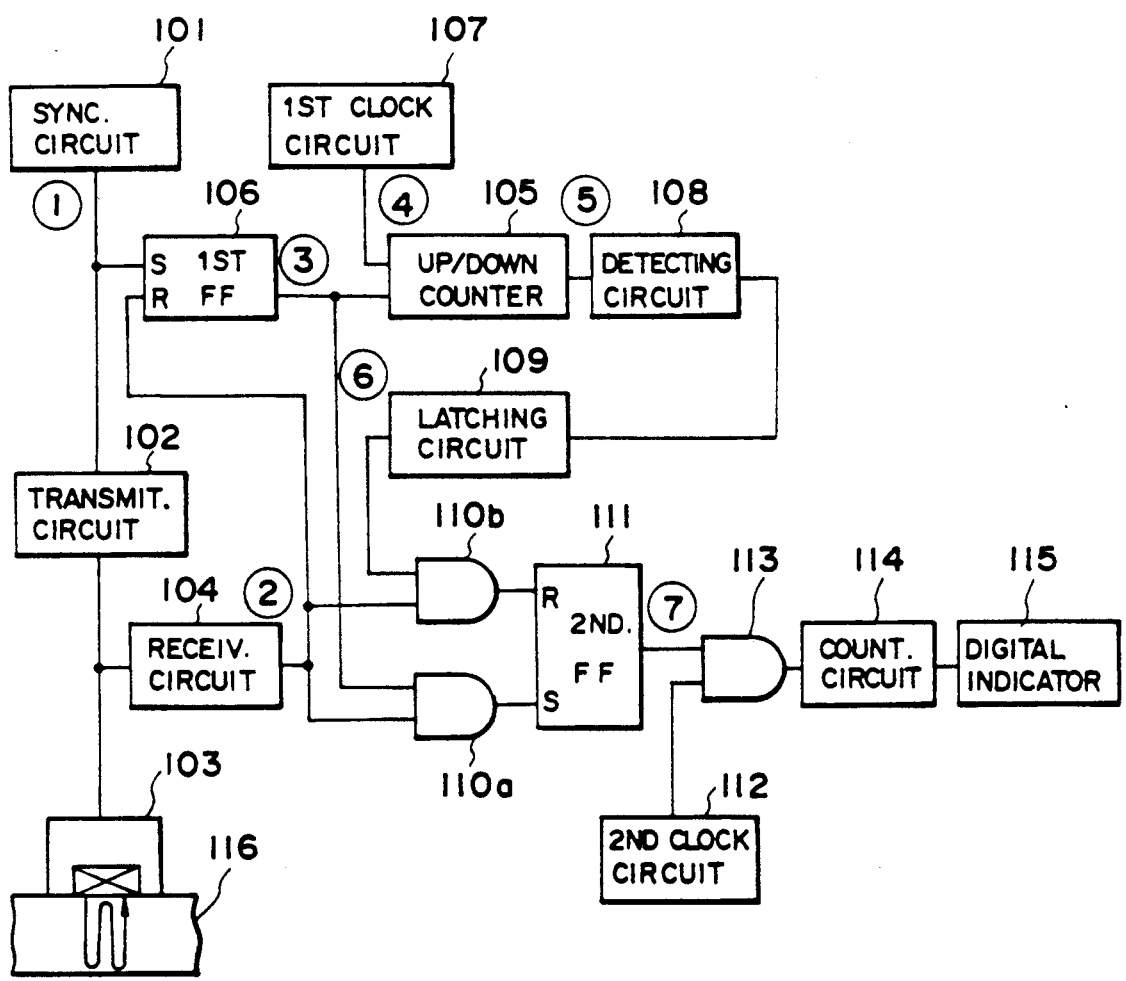
FIG. 4 is a block diagram of a first form of the ultrasonic thickness measuring apparatus embodying the present invention.

FIG. 4 is a block diagram showing a configuration of one embodiment of the present invention.

In the figure, 101 is a synchronizing circuit, 102 is a transmitting circuit and 104 is a receiving circuit, which constitutes ultrasonic transmitting/receiving means. 103 is a probe which is connected to the transmitting circuit 102 and the receiving circuit 104.

In the present embodiment, a first AND gate 110a functioning as a gate for selecting a first reflection pulse B1 and a second AND gate 110b functioning as a gate for selecting a second reflection pulse B2 are provided after the receiving circuit 104 of the ultrasonic transmitting/receiving means.

The present embodiment further includes a first flip-flop circuit 106 as means for controlling the AND gate 110a. The flip-flop circuit 106 is set by an output from the synchronizing circuit 101 and reset by an output from the receiving circuit 104.

The embodiment further includes an up/down counter 105 whose counting is controlled by the first flip-flop circuit 106 as means for controlling the AND gate 110b, a first clock generating circuit 107 for providing first clock pulses of a predetermined period to the up/down counter 105, a detecting circuit 108 for detecting a count value of the up/down counter 105 and a latching circuit 109 for latching an output from the detecting circuit 108 to generating a gate control signal.

In the present embodiment, there are further provided a second flip-flop circuit 111, as means for detecting the first reflection pulse and the second reflection pulse, which is set by the first reflection pulse and reset by the second reflection pulse, an AND gate 113 which is controlled by an output from the second flip-flop circuit 111 to pass second clock pulses therethrough when the second flip-flop circuit 111 is in a set state, a second clock generating circuit 112 for generating the second clock pulses, a counting circuit 114 for counting clock pulses passed through the AND gate 113 to obtain a thickness and a digital indicator 115 for indicating, in a digital form, data of the thickness obtained from the counting circuit 114.

An operation of the present embodiment will now be described.

Figure 5:
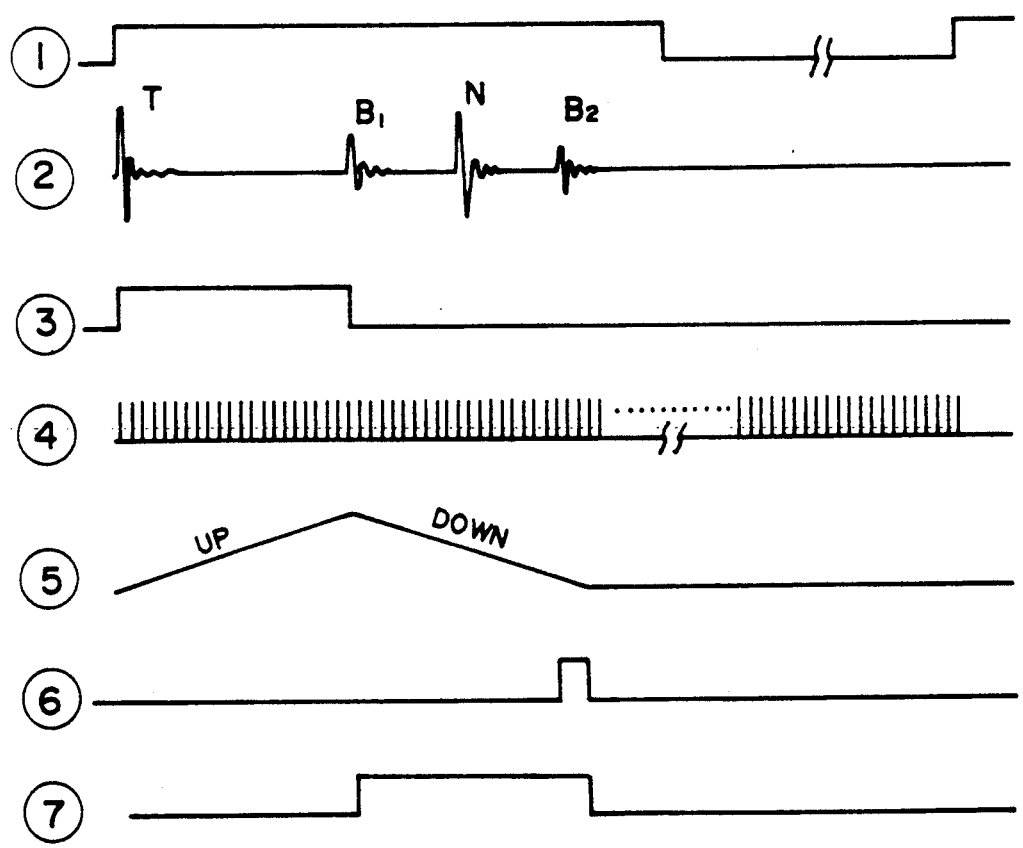
FIG. 5 is a waveform diagram for operation of the apparatus of FIG. 4.
Figure 6:
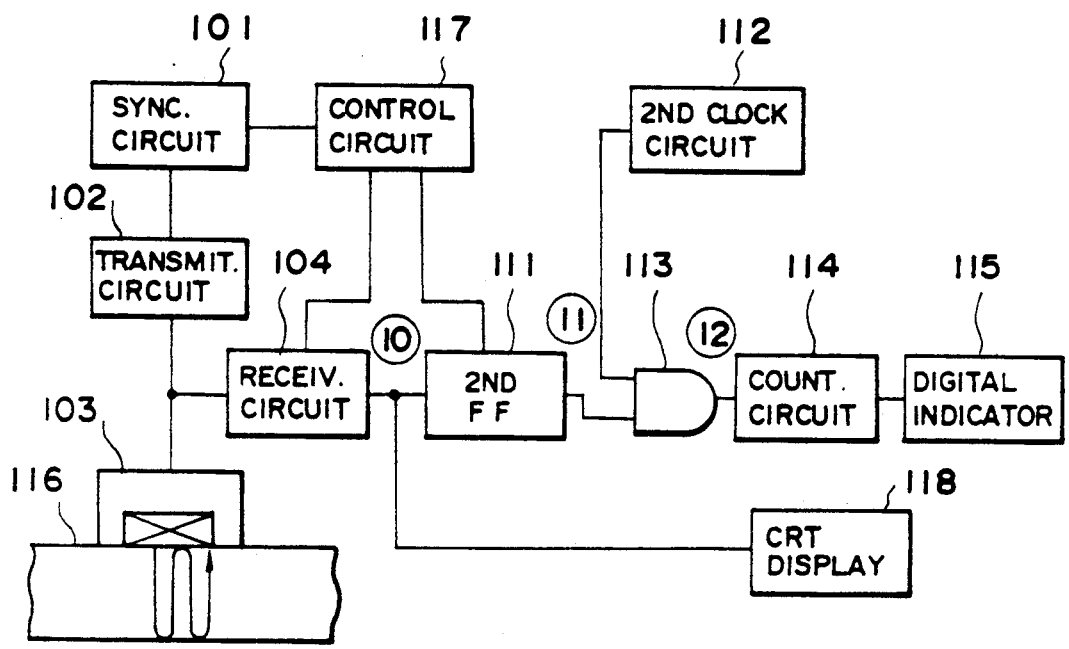
FIG. 6 is a block diagram of one example of a conventional ultrasonic thickness measuring apparatus.
Figure 7:
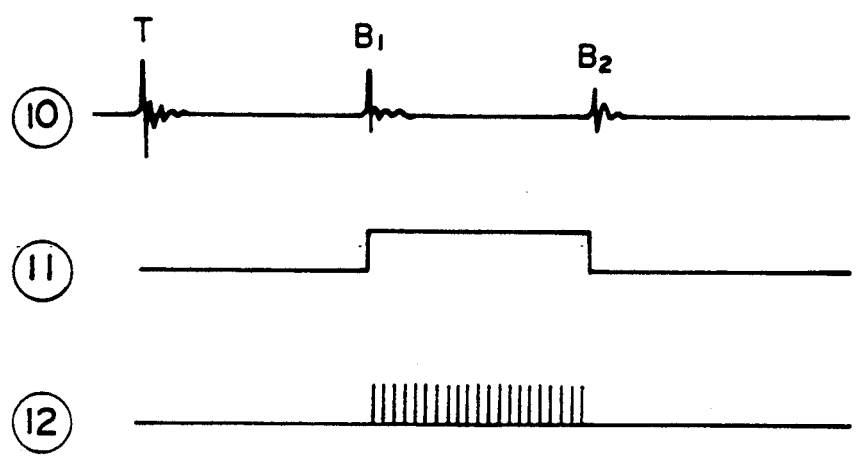
FIG. 7 is a waveform diagram for operation of the apparatus of FIG. 6.

FIG. 5 shows examples of operation waveforms in the present embodiment. In the figure, ①  is a synchronizing pulse for determining the timing of an ultrasonic pulse, ② is a transmission pulse T, a first reflection pulse B1, a second reflection pulse B2 and undesired signal N output from the receiving circuit 104, ③ is an output signal from the first flip-flop circuit 106, ④ is first clock pulses output from the first clock generating circuit 107, ⑤ is an exemplarily shown operation of the up/down counter 105, ⑥ is an output signal from the latching circuit 109, and ⑦ is a measuring gate output from the second flip-flop circuit 111.

In an ultrasonic thickness measuring apparatus arranged as described above, the measurement of the thickness utilizing multiple reflection pulses from the material 116 to be measured is free from an influence due to delay of propagation of ultrasonic waves within the inside of the probe 113 or influence of a coat on the surface of the material 116 or an oil coat used as a couplant. In the apparatus according to the present embodiment, the measurement of the thickness is carried out, while correcting the travel time of the ultrasonic pulse between the surface and the bottom of the material according to a sonic velocity.

When the transmitting circuit 102 is energized by the synchronizing pulse ① output from the synchronizing circuit 101 and a transmission pulse T is emitted from the probe 103 to the material 116 to be measure, the flip-flop circuit 106 is set and the up/down counter 105 starts up-counting by the first clock pulse from the first clock pulse generating circuit 107.

The first reflection pulse B1 which is a first reflection pulse from the bottom of the material 116 is received by the probe 103 and amplified by the receiving circuit to reset the first flip-flop circuit 106 and at the same time set the second flip-flop circuit 111 through the AND gate 110a.

The up/down counter 105 starts down-counting by an output from the first flip-flop circuit 106 and, at the same time, the AND gate 110a is closed, so that the second flip-flop circuit will not be set again by the received signal.

When the count value of the up/down counter decreases and the left reaches a value corresponding to a preset width of the gate, the detecting circuit 108 detects it. An output from the detecting circuit 108 is held by the latching circuit 109 to open the AND gate 110b. When the second reflection pulse B2 from the bottom of the material 116 is output from the receiving circuit 104, the second flip-flop circuit 111 is reset through the AND circuit 110b.

At this time, an undesired signal N produced between the first reflection pulse B1 and the second reflection pulse B2 is blocked by the AND gate 110b because it is closed. Thus, interference with the second flip-flop circuit is prevented.

When the count value of the up/down counter 105 reaches zero, the latching circuit 109 is released and the AND circuit 110b is closed. As a result of this, signals received thereafter are blocked by the gate.

From the output from the second flip-flop circuit 111, a measuring gate formed of the first reflection pulse B1 and the second reflection pulse B2 is obtained and it is applied to the AND gate 113 to select clock pulses of a unit time from the second clock generating circuit 112. The clock pulses are counted by the counting circuit 114 to obtain a thickness of the material 116 and the so obtained thickness is indicated by the digital indicator 115.

As described above, since the opening of the AND gate 110b is well timed around the time when the second reflection pulse B2 is generated, by the output from the latching circuit 109, interfering signals such as noises or other undesired signals are minimized to assure accurate thickness measurement.

Furthermore, as the interfering signals are substantially eliminated, an amplification gain of the receiving circuit can be large. This is especially desirable when the reflection pulse is small.

The thickness measurement utilizing multiple reflection pulses as in the present embodiment can be free from influences of delay of propagation of the ultrasonic pulse within the probe or a coat on the surface of the material to be measured or an oil film used as a couplant. Thus, accurate thickness measurement can be assured.

In the present embodiment, the up/down counter 105 may be replaced with an integration circuit or may alternatively be replaced with analog processing using analog signals.

Figure 2:
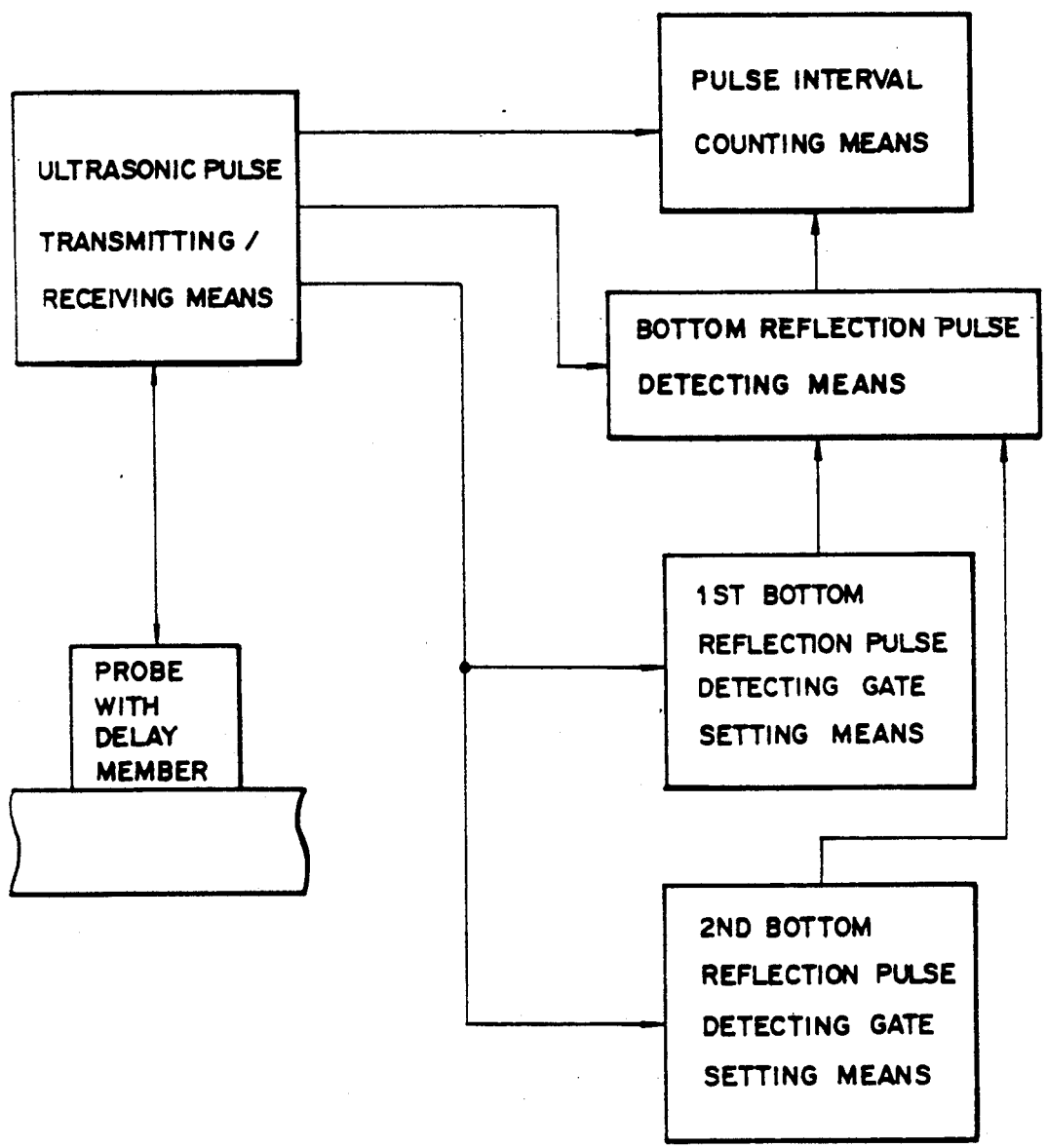
FIG. 2 is a block diagram of a configuration of another ultrasonic thickness measuring apparatus according to the present invention.

A second embodiment of the present invention will now be described. A functional block diagram of the second embodiment is given in FIG. 2.

Figure 8:
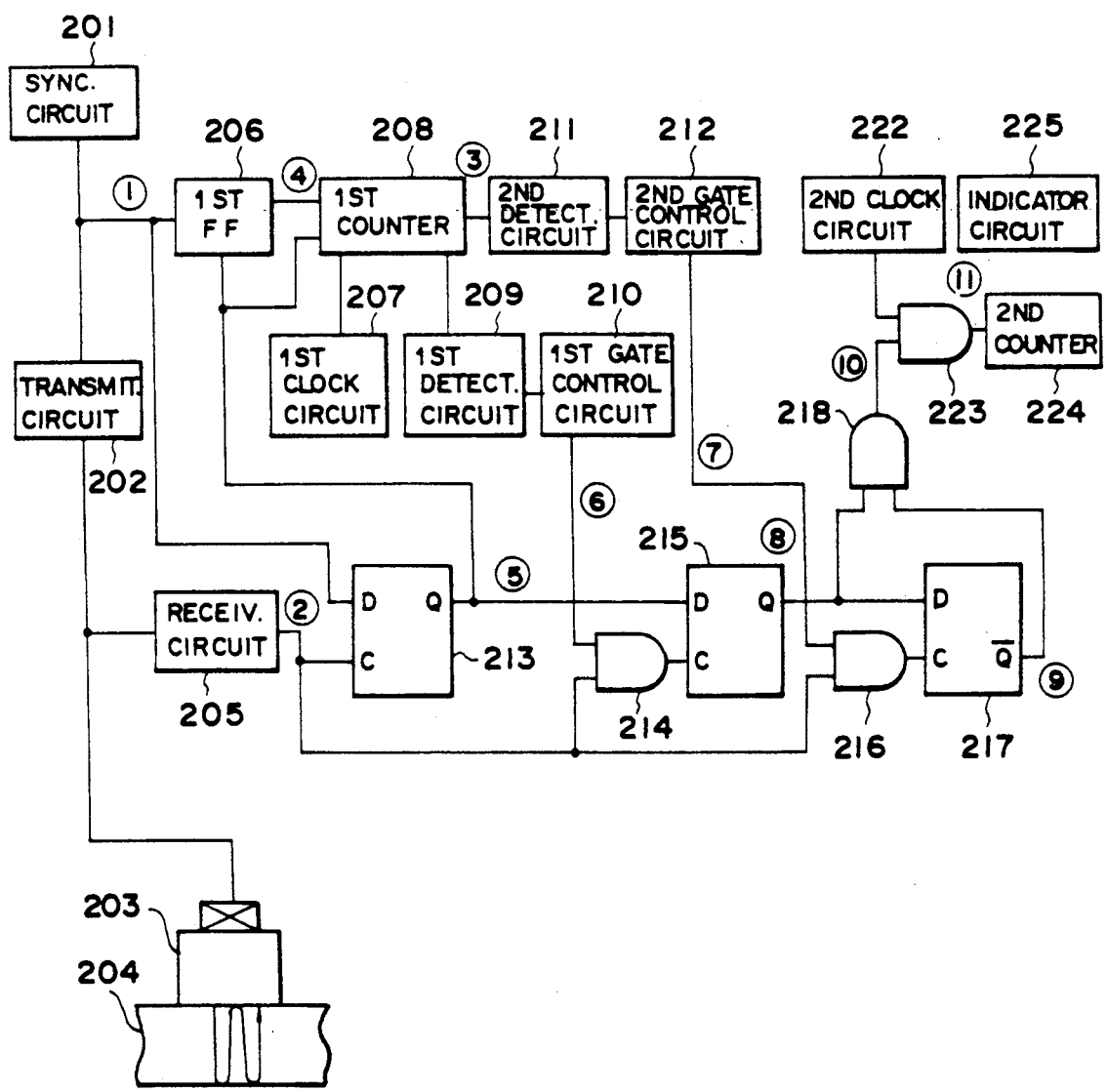
FIG. 8 is a block diagram showing another form of the ultrasonic thickness measuring apparatus embodying the present invention.
Figure 10:
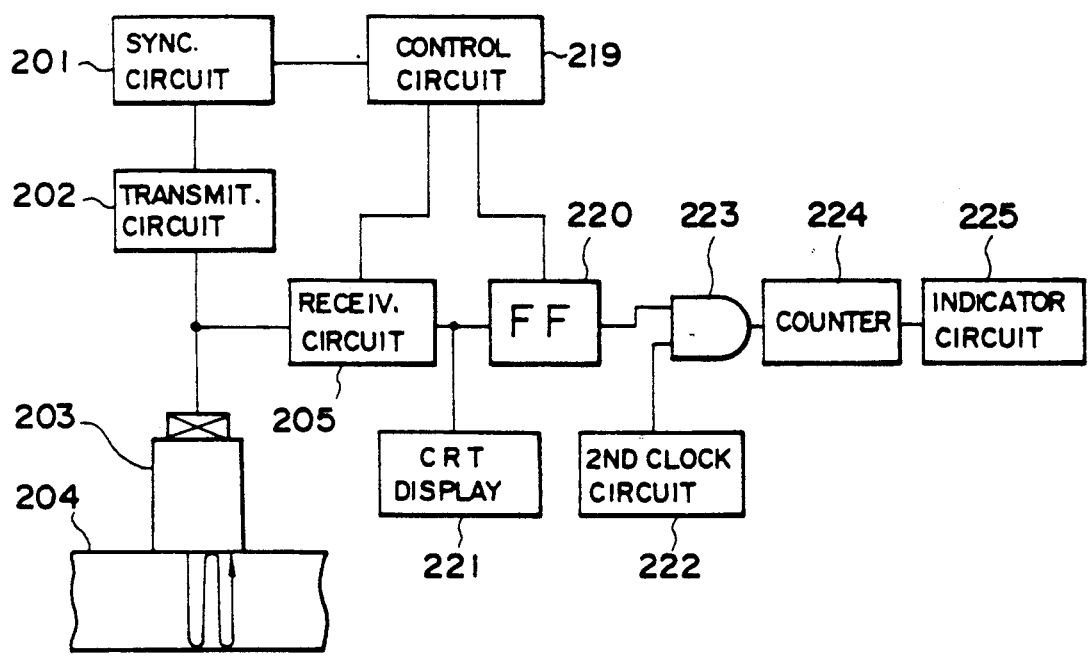
FIG. 10 is a block diagram of another form of a conventional ultrasonic thickness measuring apparatus.
Figure 11:
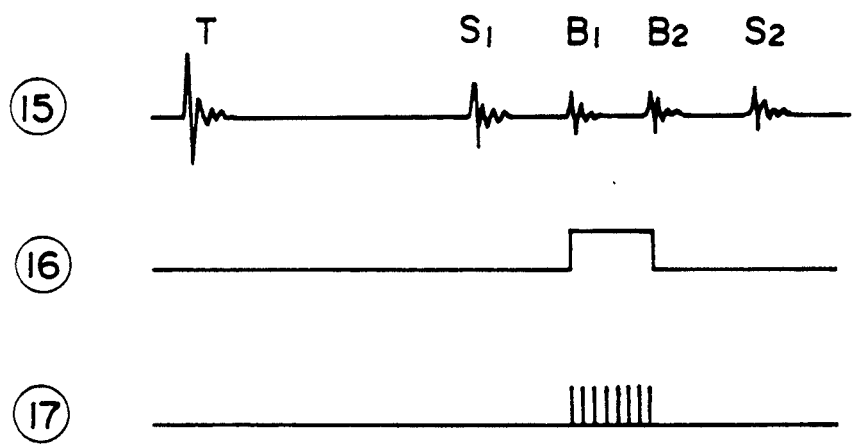
FIG. 11 is a waveform diagram for an operation of the conventional apparatus of FIG. 10.
Figure 12:
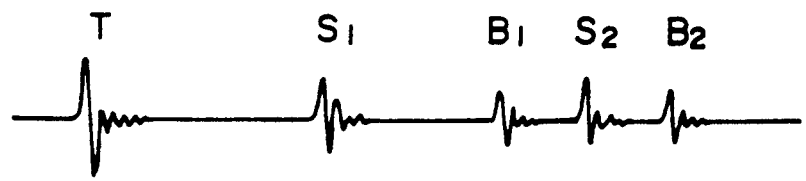
FIG. 12 is another waveform diagram for the operation of the conventional apparatus of FIG. 10.

FIG. 8 is a block diagram showing a second embodiment of the present invention. In the figure, 201 to 205 and 222 to 225 denote portions or parts similar to those of FIG. 10.

206 is a first flip-flop circuit for controlling a first counter 208, 207 is a first clock generating circuit for providing first clock pulses to the first counter 208, 208 is the first counter for carrying out up/down-counting, 209 is a first detecting circuit for detecting that the count value of the first counter 208 reaches zero, 210 is a first gate control circuit for outputting a first gate signal which lasts from start of down-counting of the first counter 208 until the count value reaches zero, 211 is a second detecting circuit for detecting a count value which is equal to an absolute value of the count value when the first counter 208 starts the down-counting but opposite in sign, 212 is a second gate control circuit for outputting a second gate signal which lasts from start of down-counting of the first counter 208 until detection by the second detecting circuit 211, 213 is a second flip-flop circuit for detecting that a first reflection pulse S1 reaches, 214 is an AND gate for outputting an "and" of the first gate signal and the reception signal, 215 is a third flip-flop circuit for detecting a first bottom reflection pulse B1 which follows the first surface reflection pulse S1, 216 is an AND gate for outputting an "and" of the second gate signal and the reception signal, 217 is a fourth flip-flop circuit for detecting a second bottom reflection pulse B2, 218 is an AND gate for outputting a measuring gate which lasts between the first bottom reflection pulse B1 and the second bottom reflection pulse B2 by an "and" of a positive-logic output from the third flip-flop circuit 216 and a negative-logic output from the fourth flip-flop circuit 217, and 224 is a second counter used for measuring the thickness of the material.

Figure 9:
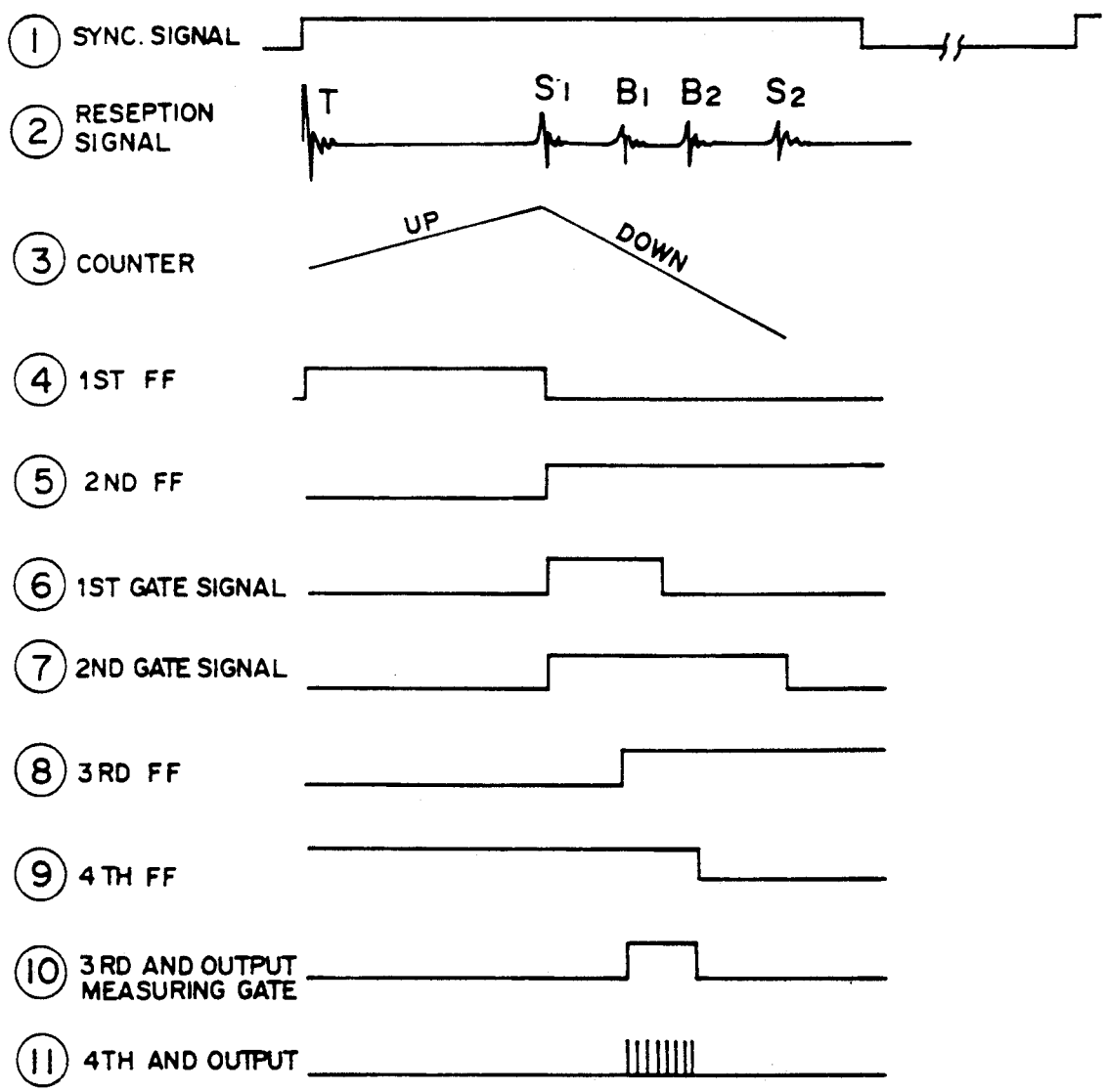
FIG. 9 is a waveform diagram for an operation of the apparatus of FIG. 8.

An ultrasonic thickness measuring apparatus arranged as described above will operate as follows:

FIG. 9 exemplarily shows operation waveforms of the present apparatus.

①  is a synchronizing pulse for determining a transmission timing of an ultrasonic pulse, ② is a transmission pulse T output from the receiving circuit 205, a first surface reflection pulse S1, a first bottom reflection pulse B1, a second bottom reflection pulse B2 and a second surface reflection pulse S2, ③ is an example of counting operation of the first counter 208, ④ is an output of the first flip-flop circuit 206 for controlling the up/down-counting of the first counter 208, ⑤ is an output from the second flip-flop circuit 213 indicative of arrival of the first surface reflection pulse S1, ⑥ is the first gate signal, ⑦ is the second gate signal, ⑧ is an output from the third flip-flop circuit 215 indicative of arrival of the first bottom reflection pulse, ⑨ is a negative-logic output of the fourth flip-flop circuit 217 indicative of arrival of the second bottom reflection pulse, ⑩ is the measuring gate, and ⑪ is a count clock signal output from the AND circuit 223.

When an electric pulse is output from the transmitting circuit 202 at the timing of the synchronizing signal ① and the probe with the delay member is energized, first flip-flop circuit 206 is set and the first counter 208 starts up-counting. When the first surface reflection pulse S1 reaches the probe 203 with the delay member from the surface of the material 204 to be measured, it is amplified by the receiving circuit 205 and the second flip-flop circuit 213 is triggered by the output ②. When the first flip-flop circuit 206 is reset by the output ⑤ from the second flip-flop circuit 213, the first counter 208 starts down-counting at a double speed. To change the counting speed of the counter, ½ frequency divider may for example be provided before the counter 208 to change the frequency of the clock pulses.

The first detecting circuit 209 detects when the count value of the first counter 208 reaches zero and the detection signal is supplied to the first gate control circuit 210. The first gate control circuit 210 generates the first gate signal ⑥ which lasts from the time when the counting of the first counter 208 is reversed until the time when the first detecting circuit 209 detects that the count value of the first counter 208 reaches zero.

The second detecting circuit 211 detects when the count value of the first counter 208 reaches a value which is equal to an absolute value of the count value when the counting is reversed to start down-counting but opposite in sign. This detection is carried out in such a manner that the count value when the operation of the first counter 208 is reversed is latched and compared with a negative-logic output of the count value from the first counter 208 in the down-counting.

The second gate control circuit 212 forms the second gate signal ⑦ which lasts from the time when the counting of the first counter 208 is reversed until the second detecting circuit 211 detects the specific count value as described above.

In the AND gate 214, the first bottom reflection pulse B1 is selected by an "and" of the first gate signal and the reception The third flip-flop circuit 215 outputs a signal ⑧ indicative of arrival of the first bottom reflection pulse B1.

The AND circuit 216 further selects and outputs sequentially the multiple reflection pulses from the material 204 to be measured, such as the first bottom reflection pulse B1 and the second bottom reflection pulse B2 by the "and" of the second gate signal and the reception signal.

Since no signal appears at a positive-logic output of the third flip-flop circuit 215 when the first bottom reflection pulse B1 reaches, the output is not changed in the fourth flip-flop circuit 217. The output from the fourth flip-flop circuit 217 changes ⑨ only after the second bottom reflection pulse B2 reaches. The AND gate 218 outputs the measuring gate ⑩ which lasts from the first bottom reflection pulse B1 to the second bottom reflection pulse B2 by an "and" of the positive-logic output of the third flip-flop circuit 215 and the negative-logic output of the fourth flip-flop circuit 217.

The AND gate 223 produces an "and" output of the measuring gate ⑩ and the clock signals from the second clock generating circuit 222 ⑪. The number of the clock pulses is counted by t counter 224 to obtain the thickness of the material 204 to be measured.

In the present embodiment, the first counter 208 starts up-counting when the ultrasonic pulse is transmitted from the probe with the delay member and starts down-counting at a double speed upon detection of the first surface reflection pulse S1 from the material 204 to be measured. The first gate signal having a holding time from start of the down-counting until the count value decreases to zero is used to select the first bottom reflection pulse B1. The second bottom reflection pulse B2 following the first bottom reflection pulse B1 is detected by the second gate control circuit 212. Thus, the measuring gate signal lasting from the first bottom reflection pulse B1 to the second bottom reflection pulse B2 is automatically formed.

If the length or sound speed of the delay member employed for tahe probe 203 is varied, the timing for detecting the first surface reflection pulse S1 is changed and accordingly the count value when the first counter 208 reverses its counting is also changed. However, the position or width of the first gate signal and the position or width of the second gate signal are automatically set to optimum conditions.

Therefore, interference of the surface reflection pulses S1 and S2 from the material to be measured can always be eliminated to ensure stable thickness measurement.

The second gate signal may alternatively be a gate signal which lasts from start of down-counting by the first counter 208 to a time immediately before the count value becomes a count value equal to an absolute value when the down-counting has started but opposite in sign to attain similar effects.

The first counter 208 may be replaced by an analog signal processing circuit such as an integration circuit.

The apparatus of the present embodiment may be applied to measurement in water in which the material 204 to be measured is dipped in water and the distance between the probe and the material 204 changes. In this case, the gate signal can selectively receive the reflection pulses from the material 204 to be measured and accurate thickness measurement can be assured.

Figure 3:
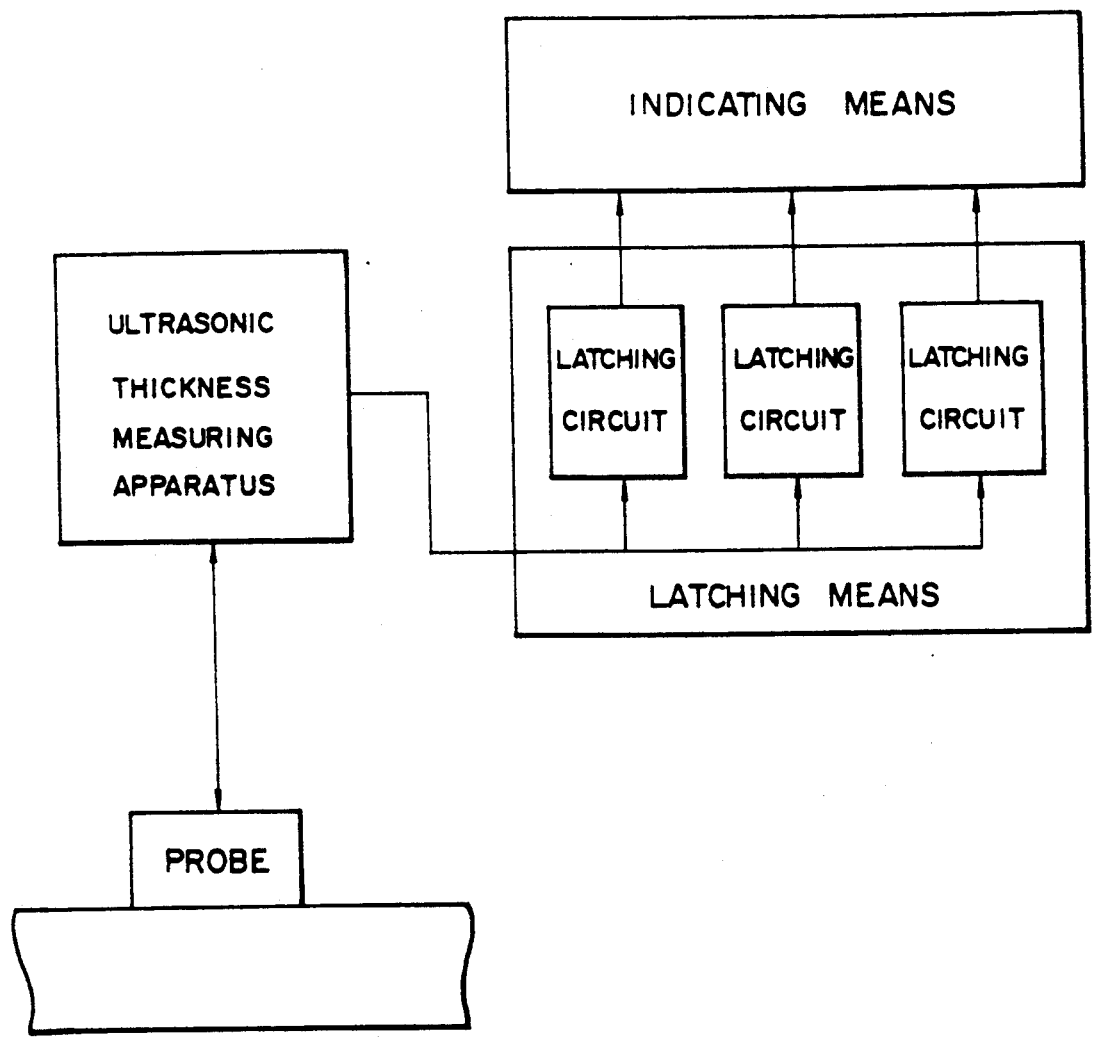
FIG. 3 is a block diagram of a check apparatus suitable for an ultrasonic thickness measuring apparatus.

A preferred form of a check apparatus for an ultrasonic thickness measuring apparatus according to the present invention as functionally shown in FIG. 3 will now be described, referring to FIGS. 13 to 15.

Figure 13:
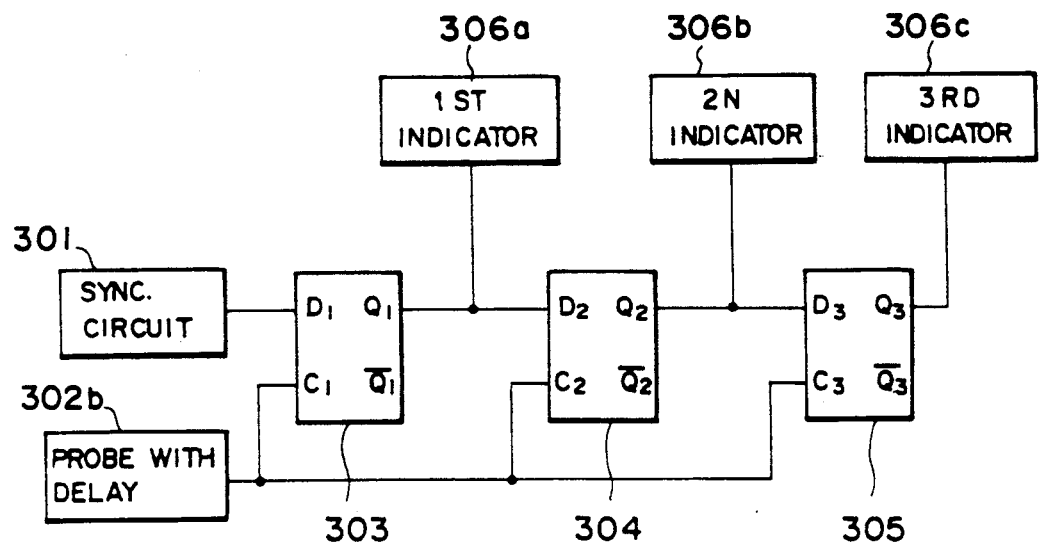
FIG. 13 is a block diagram of one form of a check apparatus for an ultrasonic thickness measuring apparatus.

FIG. 13 is a block diagram showing one form of the check apparatus for an ultrasonic thickness measuring apparatus for a material 313 to be measured using a probe 302b with a delay member.

In the figure, 302b is the probe similar to that used in the conventional apparatus as described above. 301 is a synchronizing circuit for generating a synchronizing pulse which determines the timing for transmitting an ultrasonic pulse T, 303 is a first flip-flop circuit which is operated to hold its output in response to the synchronizing pulse and a first reflection pulse from the material 313 to be measured, 304 is a second flip-flop circuit which is operated to hold its output in response to the output from the first flip-flop circuit 303 and a second reflection pulse from the material 313, 305 is a third flip-flop circuit which is operated to hold its output in response to the output from the second flip-flop circuit 304 and a third reflection pulse from the material 313, 306a, 306b and 306c are first, second and third indicators provided for the respective outputs.

In the check apparatus for the ultrasonic thickness measuring apparatus as described above, the thickness measurement by multiple back reflection pulses, using the probe 302b with the delay member is carried out as follows:

When the synchronizing pulse which is high at a time of measurement is applied to a data input terminal D1 of the first flip-flop circuit 303 from the synchronizing circuit 301 and the first reflection pulse S1 from the surface of the material 313 to be measured is applied to a clock input terminal C1, an output from Q1 is inverted in response to the first reflection pulse S1 and the output from Q1 is held high even if the input signal to the input terminal D1 is changed. The output Q1 is indicated by the first indicator 306a which shows that the first reflection pulse B1 is received with a required level.

Thus, it is confirmed that the ultrasonic transmitting circuit, the probe cable, the probe, etc. are operating normally.

When the output Q1 of high level from the first flip-flop circuit 303 is applied to an input terminal D2 of the second flip-flop circuit 304 and the second bottom reflection pulse B1 from the material 313 is applied to a C2 input terminal, an output Q2 is inverted in response to the second reflection pulse B1 to hold the output Q2 high. The output Q2 is indicated by the second indicator 603b to show that the second reflection pulse B1 is received at a required level.

If the second indicator 602 is not lit, it is known that there is something wrong with the contact conditions of the probe, couplant oil film, or attenuation of the ultrasonic pulse through the material to be measured.

When the high-level output Q2 from the second flip-flop circuit 304 is applied to an input terminal D3 of the third flip-flop circuit 305 and the second bottom reflection pulse from the bottom of the material 313 or the third reflection pulse B2 is applied to an input terminal C3, the output Q3 is inverted in response to the third reflection pulse B2 to hold the output Q3 high. The output Q3 is indicated by the indicator 603c to show that the third reflection pulse B2 is received at a predetermined level.

It is confirmed that there is no problem in the attenuation of the ultrasonic wave for the measurement when the indicator is lit.

As described above, in the thickness measurement using the probe 302b with the delay member, the first reflection pulse S1, the second reflection pulse B1 and the third reflection pulse B2 are checked separately by the output Q1 from the first flip-flop circuit 303, the second flip-flop circuit 304 and the third flip-flop circuit 305, respectively, and indicated separately to confirm that the respective reflection pulses used for the thickness measurement are received at sufficient levels.

Figure 14:
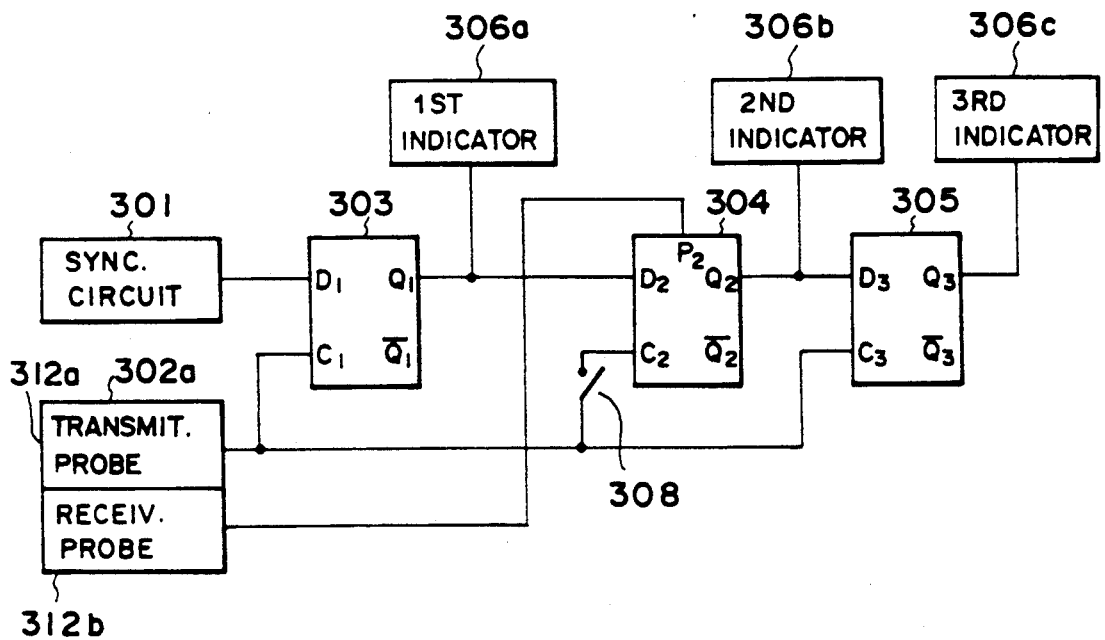
FIG. 14 is a block diagram of another form of a check apparatus for an ultrasonic thickness measuring apparatus.

FIG. 14 is a block diagram showing another form of the check apparatus for the ultrasonic thickness measuring apparatus according to the present invention, in which separate type probe 302a is used for the thickness measurement of the material 313.

In the figure, 301, 303, 304, 305, 306a, 306b and 306c are similar to those as used in the check apparatus described above and 312a and 312b are similar to those as used in the conventional check apparatus. 308 is a switching means connected to the C2 input terminal of the second flip-flop circuit 304. The first reflection pulse S1 from the surface of the material 313 received by the ultrasonic transmitter 312a is indicated on the first indicator 306a as in the first form of the check apparatus.

A high-level output Q1 from the first flip-flop circuit 303 is applied to the input terminal D2 of the second flip-flop circuit 304 to open the switching means 308. The second reflection pulse B1 from the bottom of the material 313 received by the ultrasonic receiver 312b is applied to a preset input terminal P2. The output Q2 is inverted in response to the second reflection pulse B1 and an inverted output is indicated on the second indicator 306b.

The output Q2 from the second flip-flop circuit 304 is applied to the third flip-flop circuit 305, but no third reflection pulse is not input because the separate type probe 302a is used. Therefore, the third indicator 306c is not operated.

In the thickness measurement using the separate type probe 312a, if the first indicator 306a is not lit, there might be a possibility that transmission output is lowered or the cable of the ultrasonic transmitter 312a is disconnected. If the first indicator 306a is lit and the second indicator 306b is not lit, there might be something wrong with attenuation of the ultrasonic wave within the material 313, or connection of the ultrasonic receiver 312b.

Figure 15:
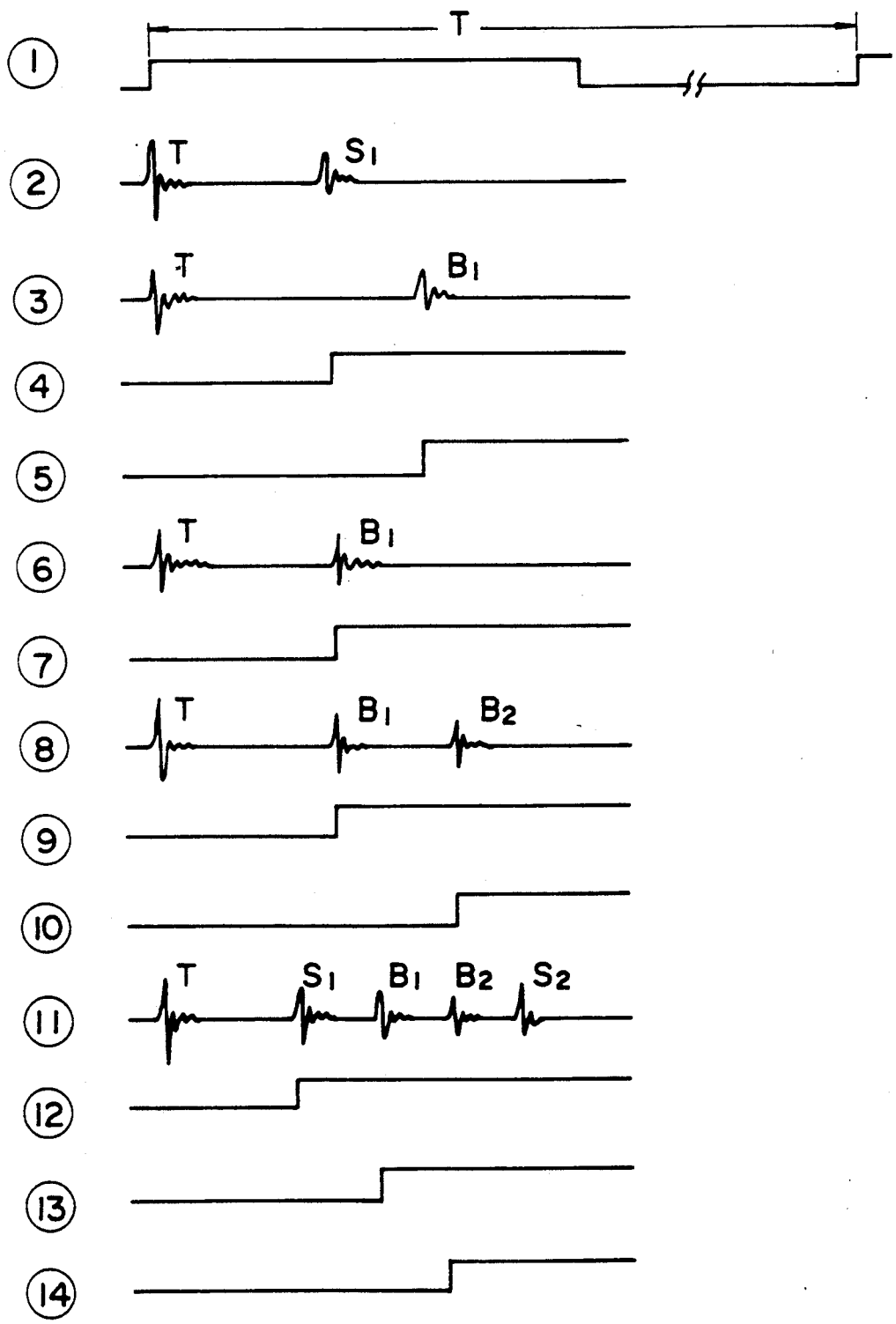
FIG. 15 is a waveform diagram for an operation of the check apparatus according to the present invention.
Figure 16:
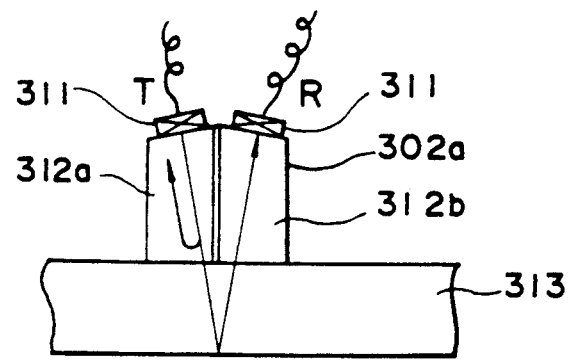
FIG. 16 is an explanatory view showing a conventional check apparatus for an ultrasonic thickness measuring apparatus.
Figure 16:
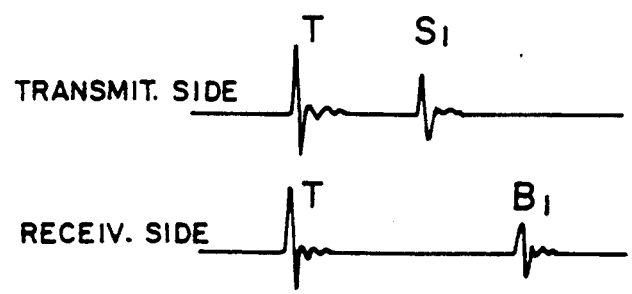
Figure 17:
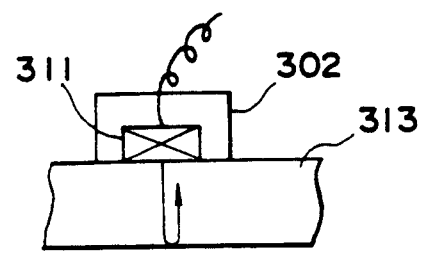
FIGS. 17 to 19 are explanatory views each showing another form of a conventional check apparatus for an ultrasonic thickness measuring apparatus.
Figure 18:
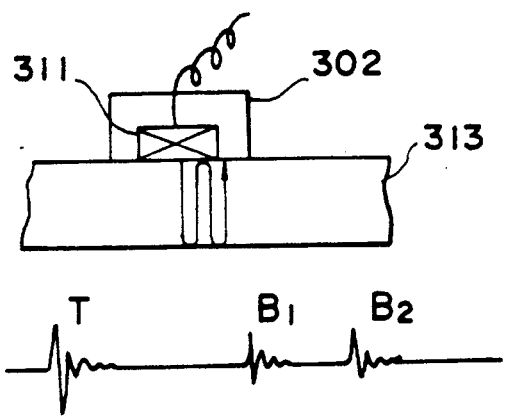
Figure 19:
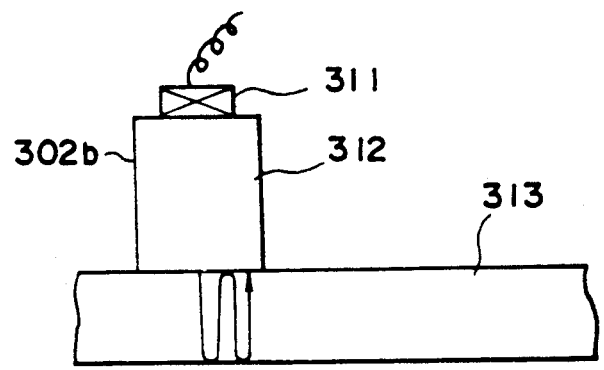
Figure 19:
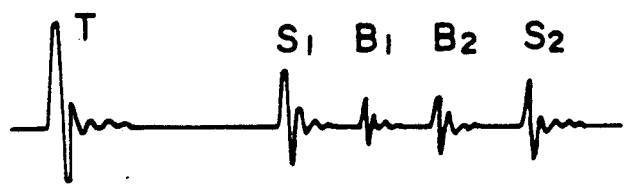

FIG. 15 shows examples of operation waveforms used in the check apparatuses according to the present invention.

① is a synchronizing pulse, ② is reflection pulse received by the ultrasonic transmitter 312a for using the thickness measurement by the separate type probe, ③ is reflection pulse received by the ultrasonic receiver 312b, ④ is an output Q1 from the first flip-flop circuit 303, ⑤ is an output Q2 from the second flip-flop circuit 304, ⑥ is reflection pulses used for the thickness measurement by a single reflection pulse according to single probe technique, ⑦ is the output Q1 from the first flip-flop circuit 303, ⑧ is reflection pulses used for the thickness measurement by multiple reflection pulses according to single probe technique, ⑨ is the output Q1 from the first flip-flop circuit 303, ⑩ is the output Q2 from the second flip-flop circuit 304, ⑪ is reflection pulses used for the thickness measurement by the probe with the delay member according to single probe technique, ⑫ is the output Q1 from the first flip-flop circuit 303, ⑬ is the output Q2 from the second flip-flop circuit 304, and ⑭ is the output Q3 from the third flip-flop circuit 305.

As described above, the flip-flop circuits are cascaded and the synchronizing pulse is applied to the input terminal D1 of the first flip-flop circuit 303 and reflection pulses from the material 313 are applied to the input terminals C of the respective flip-flop circuits, so that the respective flip-flop circuits are sequentially inverted upon input of the reflection pulses to the respective circuits.

The relationship between the type of the thickness measurement and the indicator which is lit when the reflection pulses are obtained properly is summarized as follows:

|  | 1st indicator | 2nd indicator | 3rd indicator |
| --- | --- | --- | --- |
| separate type probe | O | O |  |
| single probe technique single reflection pulse | O |  |  |
| single probe technique multiple reflection pulses | O | O |  |
| single probe technique probe with delay member | O | O | O |

According to these forms of the check apparatus embodying the present invention, the respective flip-flop circuits can operate in response to the predetermined reflection pulses to provide indication on the indicators by simple circuit formation without making any special adjustment even when the thickness or sonic velocity of the material 313 to be measured is varied or the types of the probe or measuring technique is changed. Therefore, the reflection pulses used for the thickness measurement can be checked and the results are indicated separately and automatically.

More specifically, the contact conditions between the probe 302 and the material 313 to be measured, conditions, especially defected, of acoustic coupling due to surface roughness of the material 313 or insufficiency of the couplant oil film, attenuation of the ultrasonic wave within the material 313, lowering of the ultrasonic output, and deterioration of the performance of the thickness measuring apparatus can be separately checked. When the check apparatus according to the present invention is used with an ultrasonic thickness measuring apparatus, the reliability of the operation of the ultrasonic thickness measuring apparatus can be enhanced very much, improving the measuring accuracy.

We claim:

1. An ultrasonic thickness measuring method in which an ultrasonic pulse is transmitted from a probe into a material having a thickness to be measured, and resulting multiple reflection pulses from the material are detected to obtain a time interval between the reflection pulses to derive the thickness of the material, said method comprising the steps of:
   transmitting an ultrasonic pulse into a material whose thickness is to be measured;
   detecting a first reflection pulse from a bottom surface of said material;
   measuring a first time period from the transmission of the ultrasonic pulse to reception of said first reflection pulse;

detecting a second reflection pulse received within a preset period of time occurring after said first reflection pulse has been received, said preset period of time ending immediately prior to the end of a second time period corresponding in duration to said first time period, said second time period beginning immediately after detecting said first reflected pulse; and measuring a third time period between the reception of the first reflection pulse and the reception of the second reflection pulse whereby said third time period corresponds to a measure of the thickness of the material.

2. An ultrasonic thickness measuring apparatus having a probe, ultrasonic pulse transmitting/receiving means for transmitting an ultrasonic pulse through the probe to a material having a thickness to be measured and receiving and detecting resultant reflection pulses from the material and pulse interval measuring means for measuring a time interval between the detected pulses to derive said thickness of the material from the measured time interval, which apparatus comprises:

transmitting means for transmitting an ultrasonic pulse into a material whose thickness is to be measured;

receiver means for receiving said ultrasonic pulse transmitted into, and reflected by, said material;

reflection pulse detecting gate setting means for measuring a first time period between transmission of the ultrasonic pulse and reception of a first pulse reflected from a bottom surface of the material and responsive thereto generating a control signal for setting a reflection pulse detecting gate which opens responsive to a signal indicating the end of a second time period having a duration determined by the difference between a preset gate width time period and said first time period, said second time period beginning after reception of said first reflection pulse and closes responsive to a signal indicating that a third time period equal to said first time period has elapsed, said third time period beginning immediately after reception of the first reflection pulse; and second reflection pulse detecting means for detecting a pulse received when a second reflection pulse detecting gate is open, as a second reflection pulse from a bottom surface of the material;

said pulse interval counting means measuring a fourth time period between reception of the first reflection pulse and detection of the second reflection pulse, said fourth time period being representative of said material thickness.

3. An ultrasonic thickness measuring method in which an ultrasonic pulse is transmitted from a probe with a delay member to a material having a thickness to be measured and resulting reflection pulses from the material whose thickness is to be measured are detected to obtain a time interval between the reflection pulses for deriving the thickness of the material, which method comprises:

transmitting an ultrasonic pulse into a material whose thickness is to be measured;

receiving a first reflection pulse from a top surface of said material;

measuring a first time period from said transmission of the ultrasonic pulse to reception of said first reflection pulse from the top surface of said material;

setting a second time period corresponding in duration to ½ of said first time period, said second time period beginning immediately after said first surface reflection pulse has been received;

detecting a second reflection pulse received within said second time period as a first bottom reflection pulse;

disabling detection of said first bottom reflection pulse after said second time period has elapsed;

detecting a pulse received after reception of said first bottom reflection pulse within a third time period corresponding in duration to said first time period said third time period beginning after detection of said first reflection pulse, as a second bottom reflection pulse; and measuring a fourth time period between detection of the first bottom reflection pulse from the bottom of the material and detection of the second bottom reflection pulse from the bottom of the material to derive the thickness of the material.

4. An ultrasonic thickness measuring apparatus having a probe (203) with a delay member, ultrasonic pulse transmitting/receiving means (202, 205) for transmitting an ultrasonic pulse through said probe with the delay member and into a material (204) having a thickness to be measured and for receiving and detecting resultant multiple reflection pulses from the material, and pulse interval measuring means (224) for obtaining a time interval between the detected pulses to derive a thickness of the material from the obtained time interval, which apparatus comprises:

first bottom reflection pulses detecting gate setting means (209, 210) for measuring a first time period between transmission of the ultrasonic pulse and reception of a first reflection pulse from a surface of the material and setting a first bottom reflection pulse detecting gate (214) which enables detection of a first bottom reflection pulse and disables detection of the first bottom pulse when a second time period corresponding in duration to substantially ½ of said first time period has passed;

a second bottom reflection pulse detecting gate setting means (211, 212) measuring the time between transmission of the ultrasonic pulse and reception of said first reflection pulse from the surface of the material and setting a second bottom reflection pulse detecting gate (216) which enables detection of a second bottom reflection pulse upon reception of said first surface reflection pulse and disables detection of said second bottom reflection pulse when a third time period corresponding in duration to said first time period has passed said third time period beginning after detection of said first surface reflection pulse; and bottom reflection pulse detecting means (215, 217) detecting a pulse received when said first bottom reflection pulse detecting gate (214) enables detection thereof, as the first bottom reflection pulse, and detecting a pulse received when said second bottom reflection pulse detecting gate (216) enables detection and after said first bottom reflection pulse has been detected, as the second bottom reflection pulse;

said pulse interval measuring means (222, 224) measuring a fourth time period between reception of the first bottom reflection pulse and detection of the second bottom reflection pulse.

5. An ultrasonic thickness measuring apparatus as claimed in claim 2, in which said second reflected pulse detecting gate setting means comprises a clock generating circuit (107) for generating clock pulses for time measuring, an up/down counter (105) which starts up-counting the clock pulses when the ultrasonic pulse has been transmitted and starts down-counting in response to said detection of the first reflection pulse from the bottom of the material, a detecting circuit (108) for detecting when a count number during down-counting corresponds to the end of said second time period and a latching circuit (109) for latching an output in said preset gate width time period from the detection by the detecting circuit of said specified count number until the count number stored in said counter becomes zero to generate a control signal for holding the gate (110b) open thereby enabling detection of said second reflection pulse during said preset gate width time period.

6. An ultrasonic thickness measuring apparatus as claimed in claim 4, in which said first bottom reflection pulse detecting gate setting means (209) and said second bottom reflection pulse detecting gate setting means (211) have, in common, a counter (208) which starts up-counting at a first rate to an apex count value when the ultrasonic pulse has been transmitted and starts down-counting from said apex count value at a second rate which is double said first rate in response to the reflection pulse from the surface of the material; said first bottom reflection pulse detecting gate setting means (209) further comprising a first gate control circuit (210) for outputting a first gate control signal having a holding time for enabling detection of said first bottom reflection pulse from the beginning of the down-counting until the count value becomes zero and said first bottom reflection pulse detecting gate circuit (214) which is enabled in response to said gate control signal whereby detection of said first bottom reflection pulse is enabled; said second bottom reflection pulse detecting gate setting means (211) further comprising a second gate control circuit (212) for outputting a second gate control signal having a holding time continuing from said apex count value until a count value during down-counting decreases to a value equal to an absolute value of said apex count value, but opposite in sign, and said second bottom reflection pulse detecting gate circuit (216) is enabled in response to said second gate control signal whereby detection of said second bottom reflection pulse is enabled.

7. An ultrasonic thickness measuring method in which an ultrasonic pulse is transmitted from a probe into a material a thickness of which is to be measured and resulting multiple reflection pulses from the material are detected to obtain a time interval between the reflection pulses for deriving the thickness of the material, said method comprising the steps of:

transmitting an ultrasonic pulse into said material whose thickness is to be measured;

detecting a first reflection pulse from a bottom surface of said material;

measuring a first time period from the transmission of the ultrasonic pulse to reception of said first reflection pulse;

setting a predictive gating period immediately prior to the end of a second time equal in duration to said first time period and beginning immediately after detection of the first reflected pulse to allow a pulse received during said predictive gating period to be detected as a second reflection pulse; and measuring a third time period between the reception of the first reflection pulse and the reception of the second reflection pulse whereby said third time period corresponds to a measure of the thickness of the material.

8. An ultrasonic thickness measuring apparatus having a probe, ultrasonic pulse transmitting/receiving means for transmitting an ultrasonic pulse through the probe to a material having a thickness to be measured and receiving a detecting resultant reflection pulses from the material and pulse interval measuring means for measuring a time interval between the detected pulses to derive said thickness of the material from the measured time interval, which apparatus comprises:

a first means responsive to the transmission of an ultrasonic pulse to be actuated to receive a first reflection pulse from the material whose thickness is to be measured;

a first time period measuring means for measuring a first time period between the transmission of the ultrasonic pulse and the reception of the first reflection pulse to determine a timing of the reception of the first reflection pulse;

a second time period measuring means for measuring a second time period corresponding in duration to said first time period, said second time period beginning immediately after the reception of the first reflection pulse;

a second means actuatable during a preset period of time immediately prior to the end of the second time period for allowing another reflection pulse from the material to be received;

a third means for determining a timing of the reception of said another reflection pulse from the material; and a third time period measuring means for measuring a third time period between the reception of the first reflection pulse and the reception of said another reflection pulse from the material whereby said third time period corresponds to a measure of the thickness of the material.

* * * * *